United States Patent
Moussavi (10) Patent No.: US 8,300,020 B2
(45) Date of Patent: Oct. 30, 2012

(54) HYBRID INERTIAL AND TOUCH SENSING INPUT DEVICE

(75) Inventor: Farshid Moussavi, Oakland, CA (US)

(73) Assignee: Apple Inc., Cupertino, CA (US)

( * ) Notice: Subject to any disclaimer, the term of this patent is extended or adjusted under 35 U.S.C. 154(b) by 978 days.

(21) Appl. No.: 12/192,889

(22) Filed: Aug. 15, 2008

(65) Prior Publication Data

US 2010/0039394 A1    Feb. 18, 2010

(51) Int. Cl.
*G06F 3/041* (2006.01)

(52) U.S. Cl. .................................................. 345/173

(58) Field of Classification Search .......... 345/156–184; 178/18.01–19.07; 708/131, 142–146; 341/22–34; 340/7.1, 407.1–407.2
See application file for complete search history.

(56) References Cited

U.S. PATENT DOCUMENTS

| 5,831,597 | A | 11/1998 | West et al. | |
|---|---|---|---|---|
| 5,982,302 | A | 11/1999 | Ure | |
| 6,587,093 | B1 | 7/2003 | Shaw et al. | |
| 2003/0210235 | A1* | 11/2003 | Roberts | 345/173 |
| 2004/0178997 | A1* | 9/2004 | Gillespie et al. | 345/173 |
| 2005/0012714 | A1* | 1/2005 | Russo et al. | 345/157 |
| 2006/0097991 | A1 | 5/2006 | Hotelling et al. | |
| 2006/0274041 | A1 | 12/2006 | Han | |
| 2009/0153500 | A1* | 6/2009 | Cho et al. | 345/173 |

FOREIGN PATENT DOCUMENTS

| WO | WO-0063874 A1 | 10/2000 |
|---|---|---|
| WO | WO-2010019240 A1 | 2/2010 |

OTHER PUBLICATIONS

"International Application Serial No. PCT/US2009/004632, Search Report mailed Jan. 26, 2010", 3 pgs.
"International Application PCT/US2009/004632, Written Opinion mailed Jan. 26, 2010", 8 pgs.
"Method for enabling and controlling computer input from a plurality of pointing devices", IBM Technical Disclosure Bulletin, 38(3), XPOO0508039, ISSN: 0018-8689, the whole document, (Mar. 1, 1995), 237-9.
Rekimoto and Sciammarella, "ToolStone: Effective Use of the Physical Manipulation Vocabularies of Input Devices," CHI Letters 2(2)109-117, 2000.

\* cited by examiner

*Primary Examiner* — Liliana Cerullo
(74) *Attorney, Agent, or Firm* — Schwegman, Lundberg & Woessner, P.A.

(57) ABSTRACT

A method and apparatus for tracking coarse and fine motions associated with an electronic input device is disclosed. The electronic input device can have both an inertial sensor and a touch sensor. The method includes receiving inputs from an inertial sensor and a touch sensor, and dynamically adjusting a velocity estimate of the electronic input device based on weighting or predetermined thresholds of the inputs to maximize a tracking range of the input device.

15 Claims, 4 Drawing Sheets

HYBRID INERTIAL AND TOUCH SENSING INPUT DEVICE

FIELD OF THE INVENTION

This disclosure relates to electronic input devices and more particularly to electronic input devices having both inertial sensors and touch sensors.

BACKGROUND OF THE INVENTION

Conventional input devices, such as computer mice, typically employ optical sensors, track wheels or track balls to control the motion of a cursor or other navigational object on a computer display screen. Other types of input devices that measure a force imparted onto the input device typically incorporate one or more accelerometers for sensing acceleration forces exerted on the input device as it is moved by a user. A velocity of the electronic input device may be calculated and estimated by integrating the measured acceleration over time, and a position estimate of the input device may be calculated by integrating its velocity over time. In this way, motion of an accelerometer-based input device may be translated to motion of a cursor or other navigational object on a computer display screen.

Touch-sensitive panels can also be used as an input device to control the motion of a cursor or other navigational object on a computer display screen. One common type of touch-sensitive panel is a touch pad. In general, touch-sensitive panels can detect one or more touch contacts on the surface of the touch-sensitive panel and generate signals indicative of the touch contacts. A computer can then control a cursor or other navigational object based on the detected touch contacts.

Various problems are associated with conventional input devices. For example, most, if not all, conventional input devices are inadequate in tracking both large and fine motions. For example, inertial sensing-based input devices typically track large ranges of motion well (e.g., moving a cursor across the length of a display screen), but not fine ranges of motions. In contrast, touch-sensitive pads typically track fine ranges of motions well, but not large ranges of motion. For example, moving a cursor from one end of the display screen to the other end may require a user to swipe his or her finger across a touch pad multiple times before the cursor moves to the other end of the display screen.

SUMMARY OF THE INVENTION

Embodiments of the present invention are directed to input devices using both inertial sensors and touch sensors. An exemplary input device has a motion sensing element capable of estimating a position of the input device based on a force applied to the input device. The motion sensing element can be used to track large ranges of motion. The input device can also include a touch sensitive surface operable to detect touches on the touch sensitive surface. The touch sensitive surface can be used to track relatively smaller ranges of motion.

In accordance with some embodiments, a method for using inertial inputs and touch inputs of an electronic input device can include receiving a motion input from a motion sensor, and calculating a first estimated motion based on the motion input. The method can further include receiving a touch input from a touch sensor, and calculating a second estimated motion based on the touch input. The method can further include outputting the first estimated motion if the first estimated motion exceeds a first threshold, and outputting the second estimated motion if the second estimated motion exceeds a second threshold.

In accordance with various embodiments, an electronic input device can have a motion sensing element operable to measure a motion of the electronic input device to obtain a motion input, and a touch sensing element operable to measure a touch motion on the electronic input device to obtain a touch input. The electronic input device can also include a processing element operable to calculate a first estimated motion based on the motion input and calculate a second estimated motion based on the touch input. The processing element can also operate to provide the first estimated motion as an output if the first estimated motion is greater than a first threshold, and provide the second estimated motion as an output, if the second estimated motion is greater than a second threshold. The electronic input device can also have an external interface operable to send the output to a receiving device.

In accordance with various embodiments, a computer-readable medium can have instructions for receiving a motion input from a motion sensor, and calculating a first estimated motion based on the motion input. The instructions can further include receiving a touch input from a touch sensor, and calculating a second estimated motion based on the touch input. The instructions can provide for outputting the first estimated motion estimate if the first estimated motion is greater than a first threshold, and outputting the second estimated motion, if the second estimated motion is greater than a second threshold.

In accordance with some embodiments, method for using inertial inputs and touch inputs of an electronic input device includes receiving a motion input from a motion sensor, and calculating a first estimated motion based on the motion input. The method receives a touch input from a touch sensor, and calculates a second estimated motion based on the touch input. The method obtains a first weight and a second weight, and calculates a motion output signal based on the first and the second weights, and the first and the second motion inputs. In this manner, the motion output signal can be calculated by the relationship $V=Wa*Va+Wt*Vt$, where V is the motion output signal, Wa and Wt are the respective weighting factors of the velocity Va and Vt, Va (first estimated motion) is the velocity output signal derived from the accelerometer output signal, and Vt (second estimated motion) is the velocity output signal derived from the touch sensor output signal device.

Various embodiments relate to an electronic input device having a motion sensing element operable to measure a motion of the electronic input device, and a touch sensing element operable to detect a touch motion on the electronic input device. The electronic input device can also include a processing element operable to calculate a first estimated motion based on a motion input, calculate a second estimated motion based on a touch input, and calculate an output based on a first weight and a second weight, and the first and the second motion inputs. In this manner, the output can be calculated by the relationship $V=Wa*Va+Wt*Vt$, where V is the motion output signal, Wa and Wt are the respective weighting factors of the velocity Va and Vt, Va (first estimated motion) is the velocity output signal derived from the accelerometer output signal, and Vt (second estimated motion) is the velocity output signal derived from the touch sensor output signal device. The electronic input device can also have an external interface operable to send the output to an external device.

Further embodiments relate to computer-readable medium embodying instructions for receiving a motion input from a motion sensor, and calculating a first estimated motion based on the motion input. The instructions can also include receiving a touch input from a touch sensor, and calculating a second estimated motion based on the touch input. In additional, the instructions can include obtaining a first weight and a second weight, and calculating a motion output signal based on the first and the second weights, and the first and the second motion inputs. In this manner, the motion output can be calculated by the relationship V=Wa*Va+Wt*Vt, where V is the motion output signal, Wa and Wt are the respective weighting factors of the velocity Va and Vt, Va (first estimated motion) is the velocity output signal derived from the accelerometer output signal, and Vt (second estimated motion) is the velocity output signal derived from the touch sensor output signal device.

BRIEF DESCRIPTION OF THE DRAWINGS

The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention.

Embodiments of the present invention are directed toward electronic input devices having both inertial sensors and touch-sensitive panels (e.g., touch pads). Embodiments of the invention are described herein in the context of one practical application, namely, receiving cursor control commands from an input device. Embodiments of the invention, however, are not limited to such applications, and the methods described herein may also be utilized in other applications such as game controllers. As would be apparent to one of ordinary skill in the art after reading this description, these are merely examples and the embodiments of the invention are not limited to operating in accordance with these examples.

As used herein, the term "application" includes without limitation any unit of executable software that implements a specific functionality or theme. The unit of executable software may run in a predetermined environment; for example, a downloadable Java Xlet™ which runs within the JavaTV™ environment.

As used herein, the terms "receiving device" and "receiver" include without limitation video game consoles, set-top boxes, televisions, personal computers (whether desktop, laptop, or otherwise), digital video recorders, communications equipment, terminals, mobile devices, and display devices.

As used herein, the terms "computer program" and "software" include without limitation any sequence of human or machine cognizable steps that are adapted to be processed by a computer. Such may be rendered in any programming language or environment including, for example, C/C++, Fortran, COBOL, PASCAL, Perl, Prolog, Python, Matlab, assembly language, scripting languages, markup languages (e.g., HTML, SGML, XML, VoXML), functional languages (e.g., APL, Erlang, Haskell, Lisp, ML, F# and Scheme), as well as object-oriented environments such as the Common Object Request Broker Architecture (CORBA), Java™ (including J2ME, Java Beans, etc.).

As used herein, the term "display" includes any type of device adapted to display information, including without limitation cathode ray tube displays (CRTs), liquid crystal displays (LCDs), thin film transistor displays (TFTs), digital light processor displays (DLPs), plasma displays, light emitting diodes (LEDs) or diode arrays, incandescent devices, and fluorescent devices. Display devices may also include less dynamic devices such as printers, e-ink devices, and other similar structures.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "processor," "microprocessor," and "digital processor" refer to all types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, and application-specific integrated circuits (ASICs). Such processors may be contained on a single unitary IC die, or distributed across multiple components.

As used herein, the term "interface" refers to any signal or data interface with a component or network including, without limitation, those compliant with USB (e.g., USB2), FireWire (e.g., IEEE 1394b), Ethernet (e.g., 10/100, 10/100/1000 Gigabit Ethernet, 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), modem, WiFi (802.11a,b,g,n), WiMAX (802.16), PAN (802.15), Bluetooth, or IrDA families.

As used herein, the term "wireless" refers to any wireless signal, data, communication, or other interface including, without limitation, Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Figure 1:
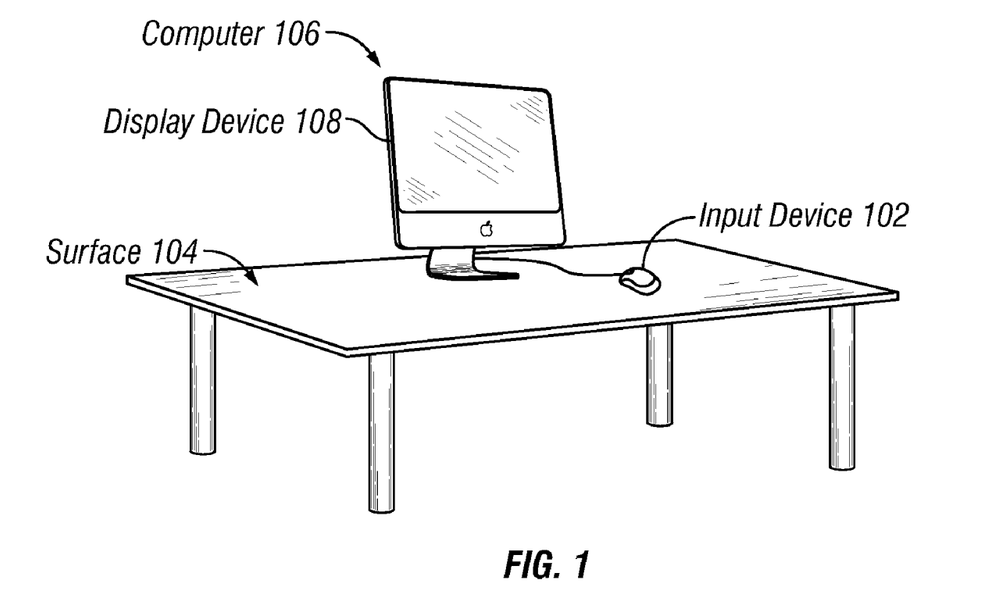
FIG. 1 illustrates a typical environment in which an input device may be used according to various embodiments of the present invention.

FIG. 1 is a block diagram illustrating a typical environment in which an input device can be used according to one embodiment of the present invention. An input device 102 is initially positioned upon a surface 104 such as a desk or a tabletop. In order to generate input data, a user manipulates the input device relative to the surface 104.

Note that in FIG. 1, the surface 104 is depicted as being flat or substantially flat; however, neither condition is necessary according to embodiments of the present invention. Also note that in some embodiments, the surface 104 need not necessarily be situated beneath the input device 102. For example, the surface 104 may be tilted, situated above the input device 102, inverted, or vertically oriented. Also note that in certain embodiments, multiple surfaces 104 can be utilized.

A receiving device (such as the depicted computer 106) is adapted to receive input data generated from the input device 102. In one embodiment, the receiving device 106 comprises at least one interface adapted to receive the generated data. The input device 102 can connect to the receiving device over a wireless or a wired communication link (such as a serial bus cable or other physical connector).

The receiving device 106 is adapted to display a navigational object (for example, a pointer, cursor, selector box, or other such indicator) upon its display screen 108. During operation, when the user manipulates the input device 102 relative to the surface 104, input signals are transmitted to the receiving device 106 and the navigational object responds according to the user's input. It is understood that the receiving device 106 can be any type of computing device having a display such as an iMac™ computer or a personal computer having a separate display monitor, for example. Other types of computing devices having a display or connected to a display (e.g., by a wired or wireless communication link) for displaying navigational objects would be readily apparent to those of ordinary skill in the art.

Figure 2:
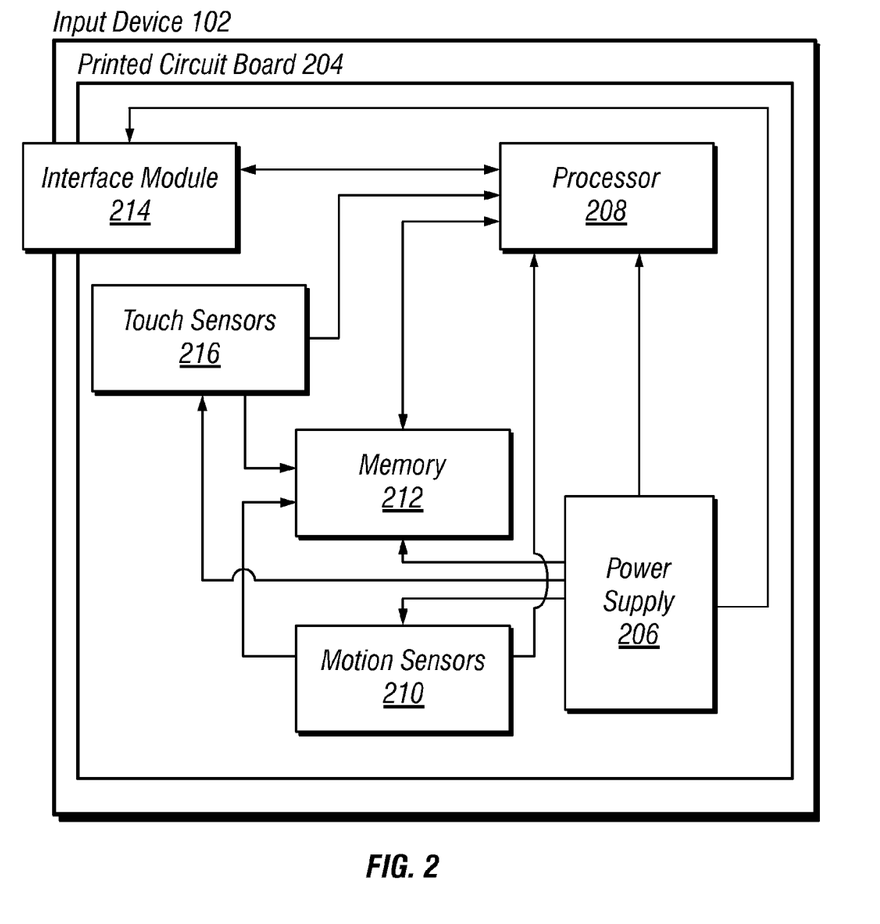
FIG. 2 is a block diagram of a modular arrangement of an input device according to various embodiments of the present invention.

FIG. 2 is a block diagram of a modular arrangement of the input device 102 according to one embodiment of the present invention. The input device 102 houses a printed circuit board 204 comprising electrical leads which enable various modules to communicate with other connected modules.

A power supply 206 provides a source of power to modules electrically coupled to the printed circuit board 204. In some embodiments, power is supplied externally from one or more conductive wires, for example, as by a power cable or serial bus cable. In other embodiments, a battery may be used as a source of power.

A memory 212 comprises any type of module adapted to enable digital information to be stored, retained, and retrieved. Additionally, the memory 212 may comprise any combination of volatile and non-volatile storage devices, including without limitation RAM, DRAM, SRAM, ROM, and/or flash memory. Note also that the memory 212 may be organized in any number of architectural configurations, such as registers, memory buffers, main memory, mass storage, and/or removable media. In some embodiments, the memory 212 is adapted to store velocity thresholds and/or applicable ranges for each measured parameter, and code or algorithms for performing the operations described herein. In alternative embodiments, this data may be stored in a remote memory source (e.g., the hard drive of the computer 106), and the input device 102 merely transmits raw data to the receiving device 106 for processing by one or more processors (not shown) in the receiving device 106.

One or more processors 208 are adapted to execute sequences of instructions by loading and storing data to the memory 212. These instructions may include, for example, instructions for data conversions, formatting operations, communication instructions, and/or storage and retrieval operations. Additionally, the processors 208 may comprise any type of digital processing devices including, for example, digital signal processors, reduced instruction set computers, general-purpose processors, microprocessors, gate arrays, programmable logic devices, reconfigurable compute fabrics, array processors, and application-specific integrated circuits. Note also that the processors 208 may be contained on a single unitary IC die or distributed across multiple components.

An interface module 214 enables data to be transmitted and/or received via one or more communication protocols or networks. In one embodiment, data transmitted to a receiving device is first packetized and processed according to a standardized protocol. In many variants, the standardized protocol may include a plurality of network layers such that each layer provides services to the layer above it and receives services from the layer below it. The interface module 216 may accommodate any wired or wireless protocol including, without limitation, USB, FireWire, Ethernet, Gigabit Ethernet, MoCA, radio frequency tuners, modems, WiFi, Blutooth, WiMax, and/or Infrared Data Association.

One or more motion sensors 210 enable the input device 102 to determine velocity values during a given instant, or alternatively, over a given period of time. Various types of motion sensors such as accelerometers, gyroscopes, etc. may be incorporated as motion sensor 210. In one embodiment, the motion sensors 210 comprise one or more accelerometers adapted to detect the current acceleration of the input device 102. In this embodiment, velocity values are determined by logic adapted to integrate a detected acceleration quantity. In one embodiment, the motion sensor 210 includes at least one micro electromechanical system (MEMS) accelerometer. Optionally, the micro electromechanical system may comprise a dedicated microprocessor adapted to interact with one or more accelerometers that sense acceleration forces exerted on the input device 102.

Input device 102 can also include one or more touch sensors 216. In general, the touch sensors 216 can be in the form of a touch-sensitive panel or pad that can detect the location of touch events (e.g., the touching of a finger or stylus) on the surface of the panel or pad via capacitive or pressure sensors. Various types of touch-sensitive panels are described in more detail in applicants' patent application Ser. No. 10/840,862, entitled "Multipoint Touchscreen," filed May 6, 2004, which is hereby incorporated by reference in its entirety.

Figure 3:
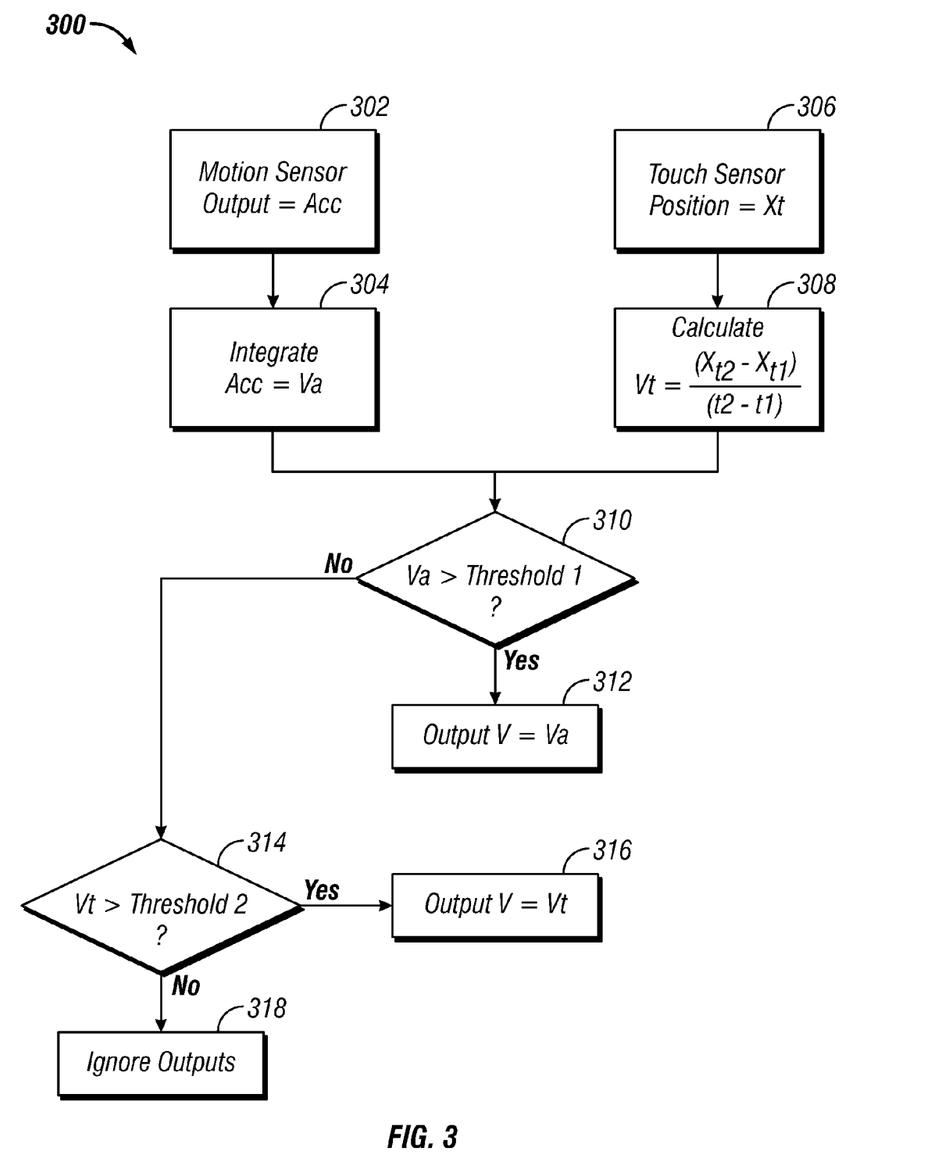
FIG. 3 is a flow diagram of a hybrid inertial and touch sensing process for an electronic input device in accordance with various embodiments of the invention.
Figure 4:
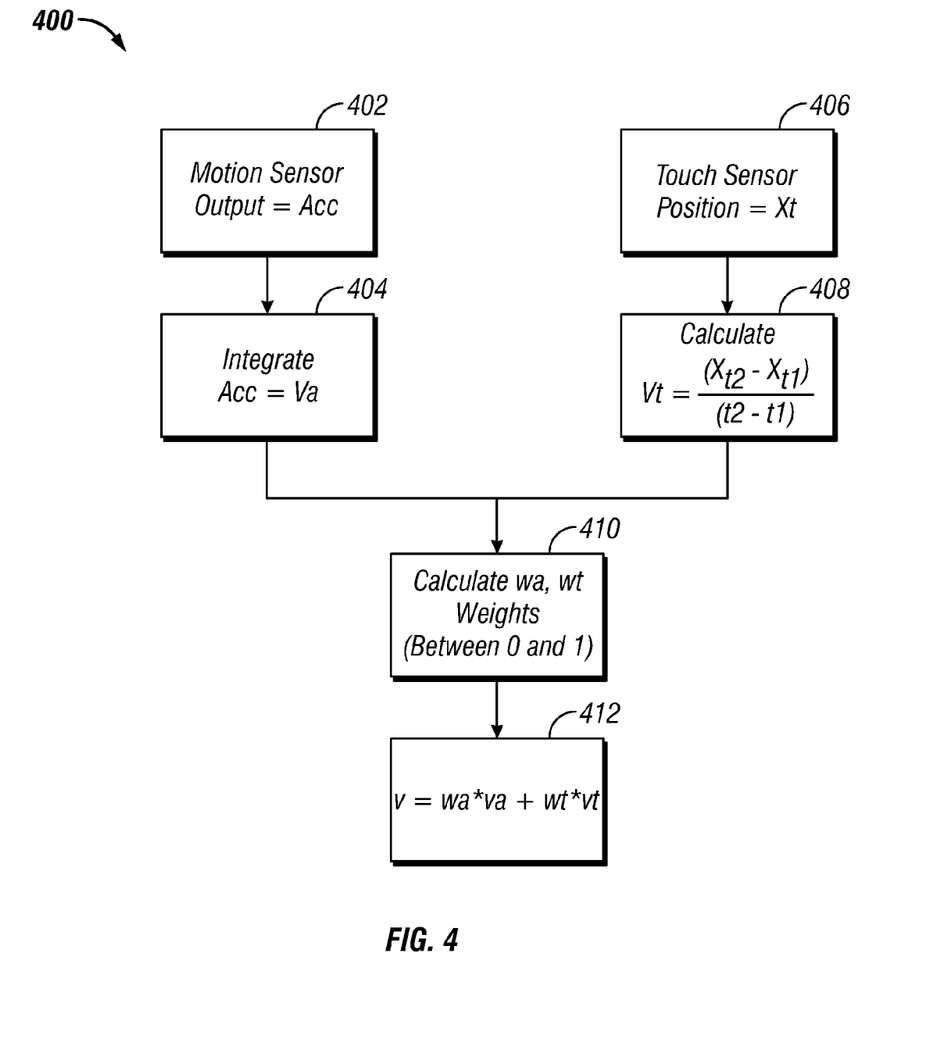
FIG. 4 is a flow diagram of another hybrid inertial and touch sensing process for an electronic input device process in accordance with various embodiments of the invention.

FIGS. 3 and 4 are exemplary flow diagrams for processes 300 and 400 in accordance with various embodiments of the invention. The various tasks performed in connection with processes 300 and 400 may be performed by hardware, software, firmware, or any combination thereof. It should be appreciated that these processes may include any number of additional or alternative tasks, the tasks shown in FIGS. 3-4 need not be performed in the illustrated order, and these processes may be incorporated into a more comprehensive procedure or process having additional functionality not described in detail herein. In various embodiments, portions of processes 300 and/or 400 may be performed by elements of system 100 (FIG. 1) and/or input device 102 (FIGS. 1 and 2).

In general, process 300 can calculate an accelerometer-based velocity Va and a touch sensor-based velocity Vt and compare the accelerometer-based velocity Va and the touch sensor-based velocity Vt to respective predetermined thresholds. Based on these comparisons, process 300 can provide an input signal that can more closely reflect a user's intended input.

With reference to FIG. 3, one or more motion sensors generate one or more signals indicative of an acceleration of the input device 102 (step 302). The acceleration value can represent a user's motion of the input device 102 used to control a graphical object displayed on a computer screen, for example.

Process 300 then calculates a velocity Va of the electronic input device in step 304. The velocity Va can be calculated by integrating the acceleration value obtained in step 302. Of course, other ways of calculating or otherwise determining a velocity of the input device 102 can be used to determine velocity Va.

In step 306, one or more touch sensors 216 generate one or more signals indicative of locations of one or more detected touches on the touch sensor 216. From changes in locations of detected touches over time, a velocity Vt can be calculated in step 308. For example, the touch sensor 216 can sense a first contact at position Xt1 on a touch sensitive-surface at time t1 and a second contact at position Xt2 on the touch-sensitive surface at time t2. Velocity Vt can then be calculated using the following expression:

$$Vt=(Xt2-Xt1)\div(t2-t1) \quad (1)$$

Alternatively velocity Vt can be determined by an instantaneous velocity or an average value of velocity over a plurality of samples, for example, about 100 samples. If (t2−t1) is the minimum unit of time in the system, in one embodiment, the velocity obtained may be an instantaneous velocity. Otherwise, it may be an average velocity during the period (t2−t1). In such cases, the averaging operation can include a low-pass filtering operation to obtain a less noisy estimate of the average velocity.

In accordance with various embodiments, steps 302 and 304 can be performed substantially concurrently with steps 306 and 308.

Process 300 can then determine which sensor output (e.g., output from the motion sensor 210 or output from the touch sensors 216) should be used to control an associated graphical object on a display screen.

In this regard, process 300 can compare the velocity value Va to a first predetermined threshold in decision step 310. If the velocity value Va exceeds the predetermined threshold, then the velocity value Va is set as the output velocity value V in step 312. Setting the velocity output V equal to the velocity value Va translates a user's movement of the input device 102 into movement of an associated graphical object, for example, without taking into account any touches of touch sensor 216.

On the other hand, if the velocity value Va does not exceed the first threshold, then the velocity value Vt can be compared to a second predetermined threshold in decision step 314. If the velocity value Vt exceeds the second predetermined threshold, then the velocity value Vt is set as the output velocity V. Velocity Vt exceeding the second predetermined threshold can indicate, for example, a user's intention to control an associated graphical object through use of the touch pad.

If Va is less than the first predetermined threshold (decision step 310) and the velocity Vt less than the second predetermined threshold (decision step 314), then process 300 need not provide any output (step 318). This can indicate, for example, that the user has provided no indication to control a graphical object.

The first and second predetermined thresholds can be selected by determining when a velocity indicates a fast movement, and can vary depending upon the particular application or user preference. In one embodiment, the first and the second predetermined threshold values are each about 4 cm/sec.

FIG. 4 is a flow diagram of another process 400 in accordance with various embodiments. In general, process 400 can calculate output velocity V by using a waited sum of velocities Va and Vt. Velocities Va and Vt can be obtained in the same fashion as explained above in steps 302-308 with reference to FIG. 3.

In step 410, process 400 can calculate or select a weighted velocity value Wa associated the velocity Va and a weighted velocity value Wt associated with velocity Vt. Process 400 can then calculate an output velocity V in step 512 using the following expression:

$$V=Wa*Va+Wt*Vt \quad (2)$$

where Wa and Wt are the respective weighting factors of Va and Vt, and V is the velocity output signal of the electronic input device.

In accordance with various embodiments, the weighted values Wa and Wt can each have a value ranging from 0 to 1 and can be selected using various criteria and in various ways. Some exemplary, non-limiting ways of selecting the weighted values Wa and Wt are provided below.

As a first example, a velocity Va that exceeds a threshold value can indicate that a user is performing a large motion with the input device 102. As a result, an output velocity largely or completely reflecting the measurements from the motion sensors 210 can be used. So that the motion sensor 210 associated velocity Va is used, Wa can be set to a value of one or close to one, and Wt can be set to a value of zero or close to zero. In this manner, the outputted velocity V will more closely reflect a velocity derived from the motion sensors 210.

As another example, a velocity Vt that exceeds a threshold value can indicate that output from the touch sensors 216 should be set as the output velocity V. In this case, Wt can be set to a value of one or close to one, and Wa can be set to a value of zero or close to zero.

As yet another example, values for Wa and Wt can be calculated by measuring energy values for each of the motion sensor output and touch sensor output, and setting the values for Wa and Wt in proportion to the energy values. For example, root mean square (RMS) values of Va and Vt can be calculated over a window of past samples, and normalized to a maximum value. Thus, the value of Wa can be equal to a normalized RMS of Va, and the value of Wt can be equal to a normalized RMS of Vt.

As yet another example, Wa and Wt can be calculated using the following expressions:

$$Wa = \max\left(\frac{V_a}{V_c}, 1\right) \quad (3)$$

$$Wt = 1 - Wa \quad (4)$$

where Vc is a selected "crossover" velocity that determines a "pivot point" so to speak at which one weighting coefficient becomes greater or more significant than the other. In accordance with one embodiment, Vc can be about 4 cm/sec. For example, if Va≧Vc, then the value for Wa is set to one, and the value for Wt is zero. This can indicate that only the motion sensor output should be used to control movement of a cursor, for example. If Va<Vc, then the value for Wa is less than one, and the value for Wt is greater than zero. This can indicate that the touch sensor output is to be used to control or affect cursor motion. It is understood that various other methods, algorithms and/or criteria for weighting may be used, as would be apparent to one skilled in the art after reading this disclosure.

An additional factor to consider when measuring velocity Vt can be the pressure exerted by a finger or stylus on the touch sensors 216. The amount of pressure on the touch sensors 216 can effect the capacitance values outputted by the touch sensors 216, since greater pressure on the touch sensors 216 can increase proximity of a dipole charge (e.g., from the finger to the touch sensors). The change in capacitance measure can then be utilized as a factor in determining a value for weight Wt. For example, increased pressure on the touch pad or sensor can indicate that a higher weight Wt should be assigned to the velocity Vt measurement.

Whether to use the method of process 300 or process 400 can depend on the type of the noise expected from the sensors used in the motion sensor or accelerometer. For example, if the noise is independent of the velocity and acceleration, and is additive, a linear relationship such as that in weighted sum methods may be preferable, since an optimum weight can be controlled. However, noise may not be well defined, and the accelerometer may have clean output below a certain output threshold and very noisy output above the threshold. In such cases, the weight may be better chosen as a non-linear function of velocity for optimal estimation. Such a function can be easily determined for various applications by those of skill in the art, without undue experimentation. It is appreciated that, in one embodiment, process 300 may be a subset of process 400 where the weight values s are simply set equal to one.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for using inertial inputs and touch inputs of an electronic input device, the method comprising:
    receiving a motion input from a motion sensor, the motion sensor configured to sense movement of the electronic input device;
    calculating a first estimated velocity (Va) based on the motion input, the first estimated velocity indicative of a velocity of the movement of the electronic input device;
    receiving a touch input from a touch sensor, the touch sensor configured to sense a user interaction with a surface of the electronic input device;
    calculating a second estimated velocity (Vt) based on the touch input, the second estimated velocity indicative of a velocity of the user interaction with the surface of the electronic input device;
    determining a first weight (Wa) associated with the motion input and a second weight (Wt) associated with the touch input, determining the first weight (Wa) includes factoring in a selected crossover velocity (Vc), the crossover velocity (Vc) defines a threshold where the first weight (Wa) or the second weight (Wt) becomes more significant; and
    calculating a motion output (V) based on the first (Wa) and the second (Wt) weights, according to the formula V=Wa*Va+Wt*Vt.

2. The method of claim 1, wherein the first weight is calculated based on a root mean square value of the first estimated velocity (Va).

3. The method of claim 1, wherein the second weight is calculated based on a root mean square value of the second estimated velocity (Vt).

4. The method of claim 1, wherein the first weight is calculated based on the following relationship:

$$Wa = \max\left(\frac{V_a}{V_c}, 1\right).$$

5. The method of claim 4, wherein the second weight is calculated based on the following relationship:

$$Wt = 1 - Wa.$$

6. An electronic input device, comprising:
    a motion sensing element operable to measure a motion of the electronic input device to obtain a motion input;
    a touch sensing element operable to measure a touch motion on the electronic input device to obtain a touch input, the touch sensing element configured to sense a user interaction with a surface of the electronic input device;
    a processing element operable to:
        calculate a first estimated velocity (Va) based on the motion input, the first estimated velocity indicative of a velocity of the movement of the electronic input device;
        calculate a second estimated velocity (Vt) based on the touch input, the second estimated velocity indicative of a velocity of the user interaction with the surface of the electronic input device;
        determine a first weight (Wa) associated with the motion input and a second weight (Wt) associated with the touch input, determining the first weight (Wa) includes factoring in a chosen velocity for crossover (Vc), the crossover velocity (Vc) defines a threshold where the first weight (Wa) or the second weight (Wt) becomes more significant; and
        calculate an output (V) based on the first (Wa) and the second (Wt) weights, according to the formula V=Wa*Va+Wt*Vt; and
    an interface operable to send the output to an external device.

7. The device of claim 6, wherein the first weight is calculated based on a root mean square value of the first estimated velocity (Va).

8. The device of claim 6, wherein the second weight is calculated based on a root mean square value of the second estimated velocity (Vt).

9. The device of claim 6, wherein the first weight is calculated based on the following relationship:

$$Wa = \max\left(\frac{V_a}{V_c}, 1\right).$$

10. The device of claim 9, wherein the second weight is calculated based on the following relationship:

$$Wt = 1 - Wa.$$

11. A tangible computer-readable storage device for an electronic input device, including program code for:
receiving a motion input from a motion sensor, the motion sensor configured to sense movement of the electronic input device;
calculating a first estimated velocity (Va) based on the motion input, the first estimated velocity indicative of a velocity of the movement of the electronic input device;
receiving a touch input from a touch sensor, the touch sensor configured to sense a user interaction with a surface of the electronic input device;
calculating a second estimated velocity (Vt) based on the touch input, the second estimated velocity indicative of a velocity of the user interaction with the surface of the electronic input device;
determining a first weight (Wa) associated with the motion input and a second weight (Wt) associated with the touch input, determining the first weight (Wa) includes factoring in a selected crossover velocity (Vc), the crossover velocity (Vc) defines a threshold where the first weight (Wa) or the second weight (Wt) becomes more significant; and
calculating a motion output (V) based on the first (Wa) and the second (Wt) weights, according to the formula V=Wa*Va+Wt*Vt.

12. The tangible computer-readable storage device of claim 11, wherein the first weight is calculated based on the following relationship:

$$Wa = \max\left(\frac{V_a}{V_c}, 1\right).$$

13. The tangible computer-readable storage device of claim 12, wherein the second weight is calculated based on the following relationship:

$$Wt = 1 - Wa,$$

where Wa is the first weight, and Wt is the second weight.

14. The tangible computer-readable storage device of claim 11, wherein the first weight is calculated based on a root mean square value of the first estimated velocity (Va).

15. The tangible computer-readable storage device of claim 11, wherein the second weight is calculated based on a root mean square value of the second estimated velocity (Vt).

* * * * *